US012607226B2

(12) United States Patent
Beyfuss et al.

(10) Patent No.: US 12,607,226 B2
(45) Date of Patent: Apr. 21, 2026

(54) CAGE SEGMENT FOR A SEGMENTED CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Maßbach (DE); Maximilian Soellner, Bundorf (DE); Jonas Schierling, Hassfurt (DE); Martin Kemmer, Werneck (DE); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 45 days.

(21) Appl. No.: 18/448,338

(22) Filed: Aug. 11, 2023

(65) Prior Publication Data

US 2024/0077111 A1 Mar. 7, 2024

(30) Foreign Application Priority Data

Sep. 1, 2022 (DE) .......................... 102022209077.2

(51) Int. Cl.
*F16C 33/46* (2006.01)
*F16C 19/06* (2006.01)
(Continued)

(52) U.S. Cl.
CPC .......... *F16C 33/4682* (2013.01); *F16C 19/06* (2013.01); *F16C 33/513* (2013.01); *F16C 33/541* (2013.01)

(58) Field of Classification Search
CPC ................ F16C 33/467; F16C 33/4676; F16C 33/4682; F16C 33/51; F16C 33/513; F16C 33/541; F16C 33/542
See application file for complete search history.

(56) References Cited

U.S. PATENT DOCUMENTS 9,316,255 B2 * 4/2016 Yasuda .................. F16C 33/585
10,458,473 B2 * 10/2019 Meder .................... F16C 33/513
(Continued)

FOREIGN PATENT DOCUMENTS

DE 102008053248 A1 4/2010
DE 102015219277 A1 4/2017
(Continued)

OTHER PUBLICATIONS

Translation of DE102021206282 obtained Feb. 13, 2015.*
(Continued)

*Primary Examiner* — James Pilkington
(74) *Attorney, Agent, or Firm* — J-TEK LAW PLLC; Scott T. Wakeman; Mark A. Ussai

(57) ABSTRACT

A cage segment for a segmented bearing cage includes first and second end walls configured to oppose first and second end surfaces of a rolling element and a first side wall and a second side wall extending from the first end wall to the second end wall and defining with the first and second end walls end a pocket for receiving the rolling element. The first and second side walls are configured to oppose a curved side surface of the rolling element. The first and/or second end wall includes at least one protrusion extending into the pocket that is configured to contact an end surface of the rolling element. Also an assembly of the cage segment and the rolling element.

12 Claims, 3 Drawing Sheets

(51) Int. Cl.
  *F16C 33/51*          (2006.01)
  *F16C 33/54*          (2006.01)

(56)                    References Cited

U.S. PATENT DOCUMENTS

|  |  |  |  |  |
|---|---|---|---|---|
| 11,846,320 | B2 * | 12/2023 | Beyfuss | ................ F16C 33/502 |
| 2018/0291959 | A1 | 10/2018 | Meder et al. | |
| 2022/0403883 | A1 | 12/2022 | Beyfuss et al. | |
| 2022/0403885 | A1 | 12/2022 | Beyfuss et al. | |
| 2022/0403886 | A1 | 12/2022 | Beyfuss et al. | |
| 2023/0220879 | A1 * | 7/2023 | Beyfuss | .............. F16C 33/6648 |
| | | | | 384/577 |
| 2024/0376932 | A1 | 11/2024 | Radina et al. | |

FOREIGN PATENT DOCUMENTS

| | | | |
|---|---|---|---|
| DE | 102016208829 | A1 | 11/2017 |
| DE | 102017103761 | A1 | 8/2018 |
| DE | 102021206282 | A1 | 12/2022 |
| DE | 102021206284 | A1 | 12/2022 |
| DE | 102021206285 | A1 | 12/2022 |
| EP | 3104030 | A1 | 12/2016 |
| GB | 875234 | A | 8/1961 |
| JP | H11325084 | * | 11/1999 |

OTHER PUBLICATIONS

Extended European Search Report from the European Patent Office dated Jan. 31, 2024 in related EP application No. 23191127.2 including Search Opinion and Search Report and machine translation thereof.

* cited by examiner

1

CAGE SEGMENT FOR A SEGMENTED CAGE

CROSS-REFERENCE

This application claims priority to German patent application no. 10 2022 209 077.2 filed on Sep. 1, 2022, the contents of which are fully incorporated herein by reference.

TECHNOLOGICAL FIELD

The present invention relates to a cage segment for a segmented cage that includes at least one contact element.

BACKGROUND

The rolling elements of a rolling-element bearing can, for example, be guided and held in the rolling-element bearing by rolling-element bearing cages. In such cages, the rolling elements can slip at least partially against a surface of the cage. For example, roller-type rolling elements, such as, for example, cylindrical or tapered rollers, can include a relatively flat surface on their end faces. If this planar end surface comes into contact with an surface of the cage that is also flat, a lubricant that is provided in the rolling-element bearing (for lubricating the contact surfaces between the rolling elements, the cage, and/or other regions of the rolling-element bearing, such as, for example, a raceway, a guide flange, and/or a retaining flange) can be scraped off in this contact region. This can cause the bearing to wear prematurely.

SUMMARY

It is therefore an aspect of the present disclosure to provide a cage segment for a segmented cage that has improved wear resistance.

In the following, a cage segment for a segmented cage is disclosed, in particular for large rolling-element bearings. The rolling-element bearing can in particular be a roller bearing, i.e., a rolling-element bearing with roller-shaped rolling elements, such as, for example, tapered rollers, cylindrical rollers, barrels, needles, and the like. Furthermore, the cage segment forms a pocket that is suitable to receive at least one rolling element.

In order to increase the wear resistance of the cage segment or of the rolling element received therein, the cage segment has at least one contact element (protrusion) on a side of the cage segment that is configured to oppose an end face of the at least one rolling element, which contact element protrudes into the pocket of the cage segment and is adapted to contact the at least one rolling element. This also has the advantage that the friction on the end surface of the at least one rolling element can be reduced since the at least one rolling element only slips against the at least one contact element and not against the cage segment itself.

According to a further embodiment, the at least one rolling element includes an abutment region and a recess region, wherein the recess region is disposed in a center of the end surface, and the abutment region is disposed around the recess region, and wherein the at least one contact element is disposed such that the at least one contact element contacts the end surface in the abutment region. In particular, the recess region can be a so-called dimple. Furthermore, the abutment region can have a curved surface, for example, a dome-shaped surface. Since the at least one contact element contacts the at least one rolling element in the region of the abutment surface, the cage segment can be prevented from slipping against an edge that forms the transition from the abutment region to the recess region. This can prevent a lubricant that is used in the rolling-element bearing from being scraped off at the edge.

The at least one contact element is preferably formed by a reshaping of the cage segment. For example, the at least one contact element can be embossed, stamped, cut and/or bent. This makes possible an efficient and cost-saving formation of the at least one contact element in the cage segment. In particular, the contour of the at least one contact element can first be partially cut and/or stamped, in particular punched out, and subsequently the contact element can be bent into the desired shape and/or position. If the at least one contact element is embossed, one work step can be sufficient in order to shape the at least one contact element.

Alternatively, the at least one contact element can be formed as a separate element and connected to the cage segment. Furthermore, if separately formed, the contact element can be releasably or captively connected to the cage segment. In particular, a separately formed contact element can be attached to the cage segment in a friction-fit, interference-fit, or material-bonded manner. For example, the at least one separately formed contact element can be welded, adhered, screwed, riveted and/or clamped onto the cage segment.

According to a further embodiment, the at least one contact element has a shape that is adapted to a shape of the abutment region. For example, the abutment region can be annular, and the at least one contact element can have an arc shape corresponding to the annular shape. Furthermore, an arrangement of the at least one contact element can be disposed on the shape and/or arrangement of the abutment region. Due to the shape of the at least one contact element adapted to the shape of the abutment region, an improved contact can be ensured between the at least one contact element and the at least one rolling element. This also has the advantage that a lubricant distribution in the rolling-element bearing can also be improved. The at least one contact element can preferably be configured lens-shaped and/or kidney-shaped. This makes it possible to better direct the lubricant to the at least one rolling element and/or to a guide flange of the rolling-element bearing. Furthermore, the at least one contact element can be provided with a structure, such as, for example, a guide curve, that is configured to guide lubricant. For example, the structure can be configured as a recess or an elevation.

The cage segment can preferably be provided with a plurality of contact elements. A contact between the cage segment and an end surface of the at least one rolling element can thereby be made more uniform so that the risk of lubricant being scraped off by contact between a contact element and the rolling elements can be further reduced. For example, the plurality of contact elements can be disposed such that their contact points with the at least one rolling element are distributed symmetrically over the abutment region of the rolling element.

Furthermore, the cage segment can be assembled from at least one sheet metal component with at least one joint. The at least one joint can advantageously also provide an adjustment possibility so that the joint is suited to compensate for manufacturing tolerances. A cage segment made of a sheet metal component is more economical in particular due to the material savings compared to a one-part cage milled from a solid metal body or a segmented cage made of PEEK plastic, since on the one hand the material use is lower, and on the other hand the degree of material utilization is higher than with conventional rolling-element bearing cages. Furthermore, the cage segment made from at least one sheet-metal component can include at least one bent corner. Since the at least one contact element protrudes into the pocket, the rolling element received in the pocket does not abut directly against the cage segment. A bending radius for the corner can thereby advantageously be enlarged so that a free space can be provided between a radial edge of the rolling element and the cage segment. The enlarging of the corner radius furthermore has the advantage of reducing the notch stress in the cage segment, and the strength of the cage segment can be increased further.

A contact element is preferably disposed laterally adjacent in the circumferential direction to each joint (that is, circumferentially next to each joint). This has the advantage that contact between the joint and the end face of the rolling element is prevented in the area of the joint and therefore reworking of the joint can be omitted. Alternatively or additionally, a welding seam for the joint can also be made thicker such that a stability of the cage segment can be increased. Furthermore, in addition to a weld bead on the outer side, a weld bead can also be applied onto the inner side.

According to a further embodiment, in a preliminary manufacturing step, the cage segment is present as an assembly kit that is comprised of one or more flat sheet-metal components that are configured to be assembled in order to form the cage segment, wherein the at least one contact element is formed in at least one of the sheet-metal components of the cage segment. The at least one contact element is preferably configured in the preliminary step of the manufacturing. A material usage and/or manufacturing expense can thereby be reduced. For example, the one or the plurality of the sheet-metal components of the cage segment can be cut from a metal sheet, in particular laser-cut, stamped, and/or nibbled so that preferably only low tool costs arise. In other words, the separating lines required for the cage segment are provided in the metal plate by cutting, stamping, nibbling, or the like. This means that the contour of the cage segment is first cut or punched into the metal plate, and the shape of the cage segment is subsequently released from the metal plate. Here a laser, a punching tool, a nibbling machine, or the like can be used. The cutting out of the cage segment can advantageously be integrated into an automated manufacturing in an assembly line and/or assembly cell.

According to a further aspect, a rolling-element bearing cage is proposed that is assembled from a plurality of cage segments described above. In particular, the plurality of cage segments can be connectable at least temporarily via a coupling element. For example, the cage segment can be connected to a closed cage. Furthermore, for example, every second rolling element can be guided and/or enveloped by a cage segment. Alternatively a cage segment can also be provided for each rolling element.

According to still a further aspect, a rolling-element bearing, in particular a large rolling-element bearing having at least one inner ring and at least one outer ring is provided in which rolling elements are disposed between the inner ring and the outer ring. The rolling elements are held by an above-described rolling-element bearing cage.

According to yet another aspect, a cage segment for a segmented bearing cage includes a first end wall and a second end wall configured to oppose a first end and an opposite second end of a rolling element and a first side wall and a second side wall extending from the first end wall to the second end wall and defining with the first end wall and the second end wall a pocket for receiving the rolling element. The first side wall and the second side wall are configured to oppose a curved side surface of the rolling element. The first end wall includes at least one protrusion extending into the pocket that is configured to contact the first end of the rolling element and/or the second end wall includes at least one protrusion extending into the pocket that is configured to contact the second end of the rolling element.

In another aspect, the first side wall of the cage segment is formed from a first metal sheet having a first portion bent to form a portion of the first end wall and a second portion bent to form a portion of the second end wall and the second side wall is formed from a second metal sheet having a first portion bent to form a portion of the first end wall and a second portion bent to form a portion of the second end wall. The first portion of the first side wall is connected to the first portion of the second side wall at a first joint to form the first end wall and the second portion of the first side wall is connected to the second portion of the second side wall at a second joint to form the second end wall. The first one of the at least one protrusion is located on the first end wall on a first side of the first joint and a third one of the at least one protrusion is located on the first end wall on a second side of the first joint. The second one of the at least one protrusion is located on the second end wall on a first side of the second joint and a fourth one of the at least one protrusion is located on the second end wall on a second side of the second joint. The first, second, third and fourth ones of the at least one protrusion are kidney-shaped.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
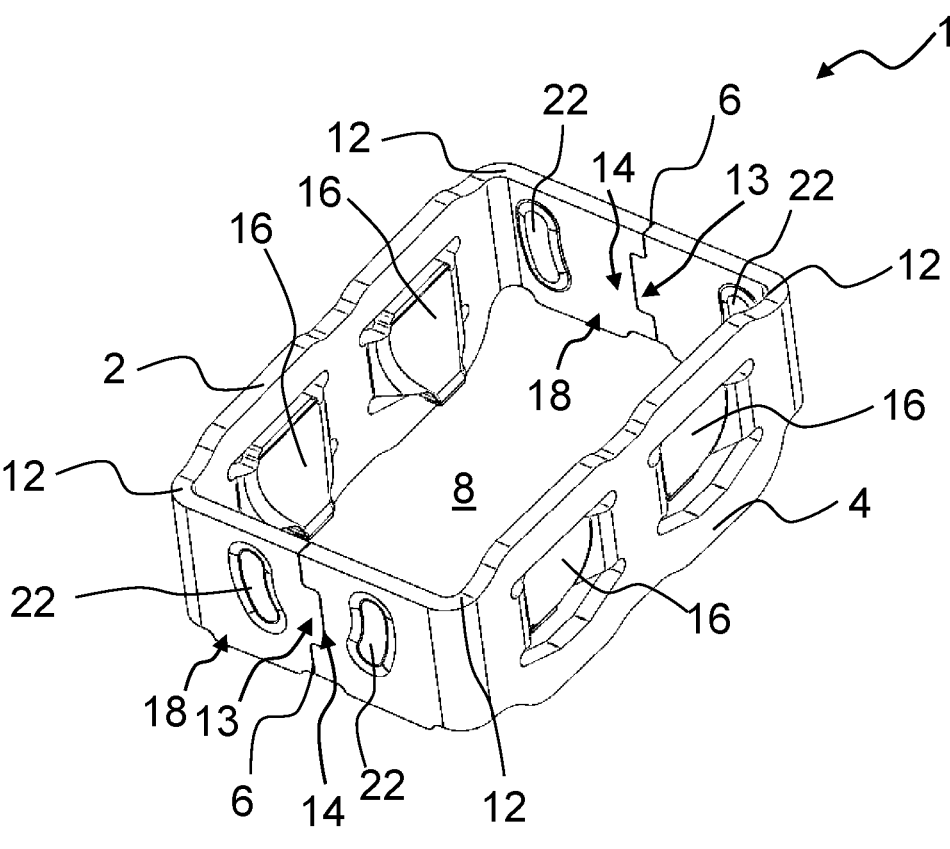
FIG. 1 is a perspective view of a cage segment according to a first embodiment of the present disclosure.
Figure 2:
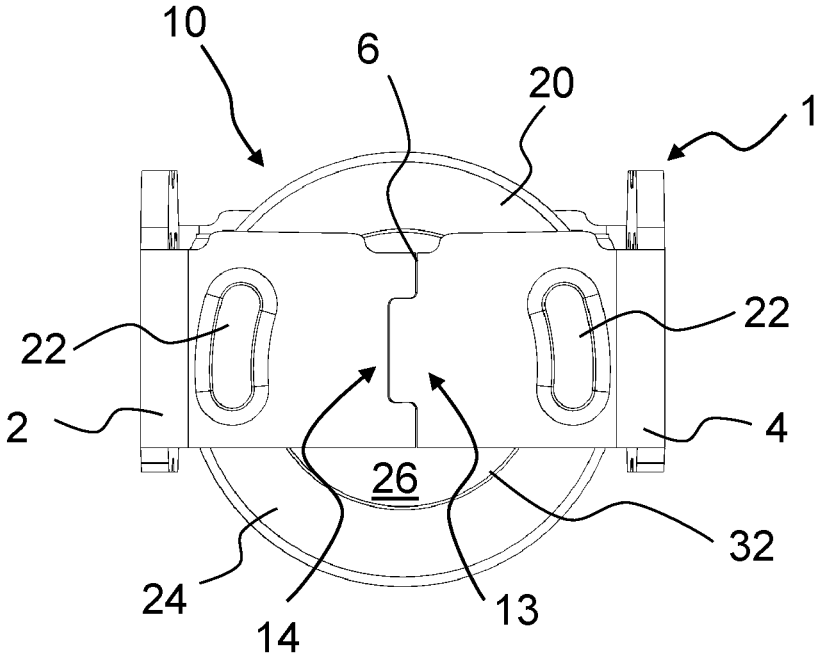
FIG. 2 is a side elevational view of a rolling element inside the cage segment of FIG. 1.
Figure 4:
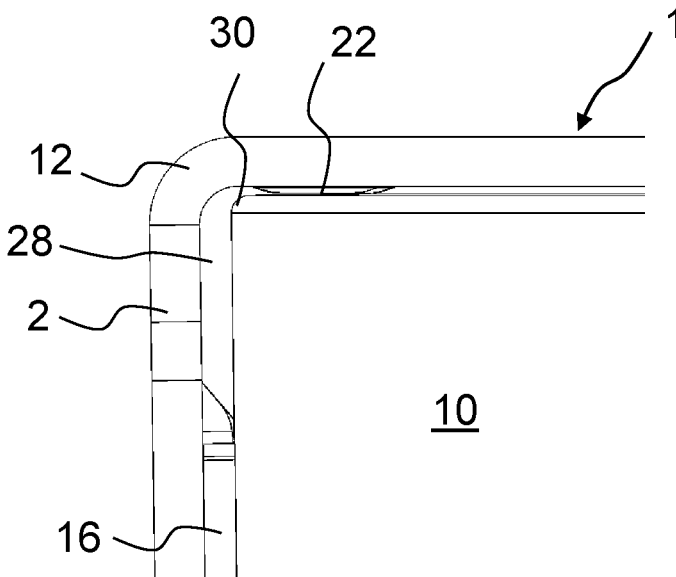
FIG. 4 is a plan view of a portion of the rolling element and cage segment of FIG. 2.
Figure 5:
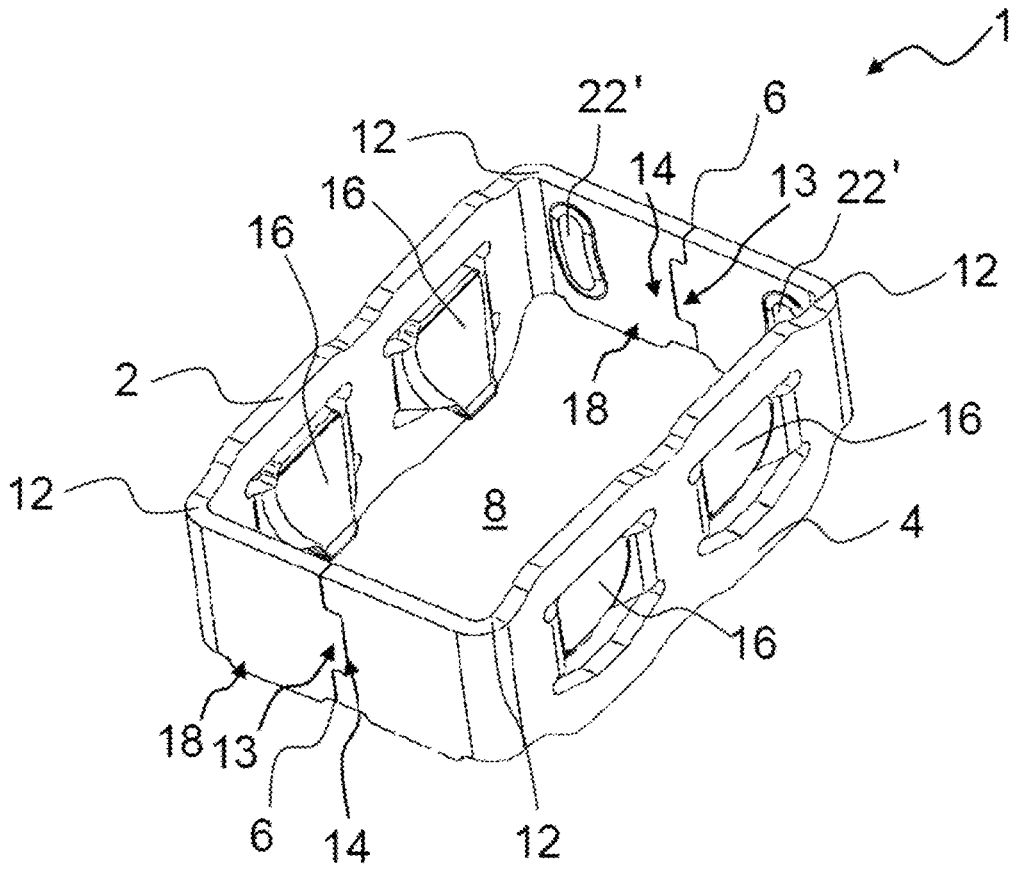
FIG. 5 is a perspective view of a cage segment according to a third embodiment of the present disclosure.

With reference to FIGS. 1, 2, and 4, a cage segment 1 according to a first exemplary embodiment is shown that is comprised of two sheet-metal components 2, 4 that are assembled at two joints 6 in order to form a pocket 8 that is configured to receive at least one rolling element 10 (FIG. 2). Alternatively, the cage segment 1 can also include only one joint 6 or more than two joints 6, for example, four joints. In a preliminary manufacturing step, the cage segment 1 is comprised of a kit with flat sheet-metal components. The cage segment can be used in in particular in a rolling-element bearing. For example, the rolling-element bearing can be a roller bearing, i.e., a rolling-element bearing with roller-shaped rolling elements, such as, for example, tapered rollers, cylindrical rollers, barrels, needles, and the like.

In order to assemble the cage segment 1 from the sheet-metal components 2, 4, the sheet-metal components 2, 4 are each bent at prescribed corner regions 12 and assembled at the two ends of a respective sheet-metal component, whereby the joints 6 are formed. The assembled cage segment 1 forms the pocket 8 that is suited to receive at least one rolling element 10, wherein the corner regions 12 form the corners of the cage segment 1. A first alignment element 13 and a second alignment element 14 are provided at the ends of the sheet-metal component that are complementary to each other. In the embodiment shown in FIGS. 1 to 3, the alignment elements 13, 14 are rectangular toothings. However, other shapes, such as, for example, wave-shaped, triangular, and/or polygonal, are also conceivable.

The two alignment elements 13, 14 can be, for example, punched and/or cut. Here the alignment elements 13, 14 are configured to align the cage segment 1 at the joint 6 such that the cage segment 1 can be joined together. In particular, the alignment elements 13, 14 are adapted to fix the joined sides in a first direction perpendicular to the surface of the pocket 8 and to provide, in at least one direction perpendicular to the first direction, an adjustability suitable to compensate for manufacturing tolerances and the like.

Furthermore, on the side walls of the cage element 1 in the region of a raceway of the rolling elements 10, four guide elements 16 are provided that are configured to guide the cage segment 1 against the rolling elements 10. However, it is also possible to omit this guide element 16 and to guide the cage element against a flange of the rolling-element bearing and/or against a raceway of the rolling-element bearing.

On the sides 18 of the cage segment 1 that are opposite the end surfaces 20 of the rolling element 10, two contact elements (protrusions) 22 are respectively provided that protrude into the pocket 8 of the cage segment 1 and are configured to contact the rolling element 10. The sides 18 may also be referred to as "end walls" of the cage segment. The rolling element 10 comprises in particular an abutment region 24 and a recess region 26, wherein the recess region 26 is disposed in the center of the end surface 20, and the abutment surface 24 is disposed around the recess region 26.

As can be seen in FIG. 2, the contact elements 22 are disposed such that they contact the end surface 20 in the abutment region 24. Here a contact element 22 is disposed laterally adjacent in the circumferential direction to each joint 6. This has the advantage that in the region of the joint 6 a contact is prevented between the joint 6 and the end surface 20 of the rolling element 10.

Since the contact elements 22 contact the end surface 20 of the rolling element 10 in the region of the abutment surface 24, the cage segment 1 can be prevented from running (rubbing) against an edge 32 that forms the transition from the abutment region 24 to the recess region 26 thereby scraping off lubricant used in the rolling bearing at the edge.

The contact elements 22 are formed by reshaping the cage segment. For example, the contact elements 22 can be embossed, stamped, cut, and/or bent. This may result in contact elements 22 that have a convex surface in the pocket and a corresponding concave surface opposite the convex surface as can be seen in FIG. 1. Furthermore, the contact elements 22 have a shape that is adapted to a shape of the abutment region 24. For example, according to the first embodiment, the contact elements 22 of the cage segment 1 are configured kidney-shaped. Alternatively the contact elements 22 can be configured as separate elements that are releasably or captively attached to the cage segment.

As can be seen in FIG. 4, due to the presence of the contact elements 22 that protrude into the pocket 8, the rolling element 10 received in the pocket 8 does not directly abut against the cage segment 1. A bending radius for the corner 12 can thereby advantageously be enlarged so that a free space 28 is provided between a radial edge 30 of the rolling element and the cage segment 1. This makes it possible to reduce a notch stress in the cage segment 10 and to increase a strength of the cage segment 1.

Figure 3:
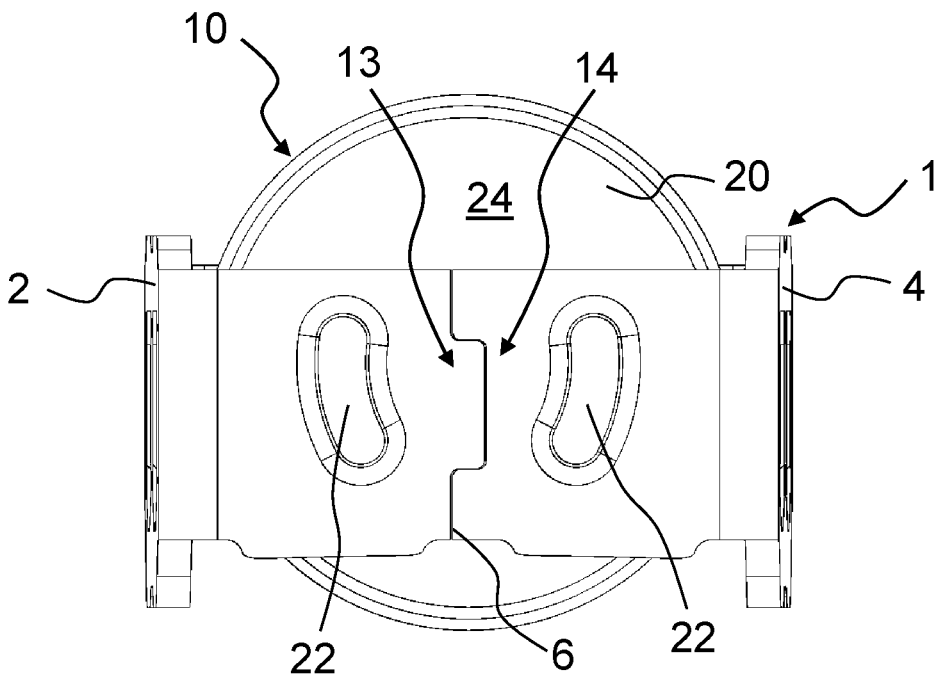
FIG. 3 is a side view of a rolling element inside a second embodiment of a cage segment according to the present disclosure.

With reference to FIG. 3, a cage segment 1 is shown according to a second exemplary embodiment. The cage segment 1 of FIG. 3 differs from the cage segment 1 of FIGS. 1, 2, and 4 in that the contact elements 22 are disposed closer in the circumferential direction to the joint 6; the contact region 24 of the rolling element 10 in FIG. 3 extends farther into the center of the end surface 20.

Although in the Figures the respective cage segment is provided on the sides 18 that are opposite the end surfaces 20 of the rolling element, it is also possible that only one contact element 22 or more than two contact elements, such as, for example, three, four, or five contact elements 22 are provided on a side 18. It is also possible that at least one contact element 22 is provided only on one of the two sides 18.

In summary, in order to increase the wear resistance of the cage segment 1 or of the rolling element 10 received therein, a contact element 22 is provided on a side 18 that opposes an end surface 20 of the rolling element 10, which contact element protrudes into the pocket 8 of the cage segment 1 and is configured to contact the rolling element 10. This also has the advantage that the friction at the end surface 20 of the rolling element 10 can be reduced since the rolling element 10 only slips against the contact element 22 and not against the greater area of the cage segment 1 itself. In other words, the rolling element 10 can be prevented from slipping against a sharp edge. A scraping off of lubricant against the edge can also advantageously be prevented.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cage segments for segmented cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage segment
2, 4 Metal plate components
6 Joint
8 Pocket
10 Rolling element
12 Corner region
13, 14 Alignment elements
16 Guide elements
18 Side
20 End surface
22 Protrusion
24 Abutment region
26 Recess region
28 Free space
30 Radial edge
32 Edge

What is claimed is:

1. A cage segment for a segmented bearing cage, comprising:
a first end wall and a second end wall configured to oppose a first end surface and an opposite second end surface of a rolling element, and
a first side wall and a second side wall extending from the first end wall to the second end wall and defining with the first end wall and the second end wall a pocket for receiving the rolling element, the first side wall and the second side wall being configured to oppose a curved side surface of the rolling element,
wherein the first end wall includes at least one protrusion extending into the pocket and configured to contact the first end surface of the rolling element and the second end wall includes at least one protrusion extending into the pocket and configured to contact the second end surface of the rolling element,
wherein the at least one protrusion of the first end wall has a convex surface in the pocket and a corresponding concave surface opposite the convex surface of the at least one protrusion of the first end wall and/or wherein the at least one protrusion of the second end wall has a convex surface in the pocket and a corresponding concave surface opposite the convex surface of the at least one protrusion of the second end wall, and
wherein the at least one protrusion of the first end wall comprises two protrusions on the first end wall and the at least one protrusion of the second end wall comprises two protrusions on the second end wall.

2. The cage segment according to claim 1, wherein the at least one protrusion of the first end wall is embossed, stamped, cut and/or bent from the from the first end wall and/or the at least one protrusion of the second end wall is embossed, stamped, cut and/or bent from the second end wall.

3. The cage segment according to claim 1,
wherein the first and second end walls and the first and second side walls are formed from at least one metal sheet having a first end connected to a second end at at least one joint.

4. The cage segment according to claim 3,
wherein a first one of the at least one joint is located on the first end wall, and
wherein the two protrusions of the first end wall are located on opposite sides of the at least one joint.

5. The cage segment according to claim 1,
wherein the at least one protrusion of the first end wall and the at least one protrusion of the second end wall are kidney shaped.

6. A rolling-element bearing cage comprising a plurality of the cage segments according to claim 1.

7. A cage segment for a segmented bearing cage, comprising:
a first end wall and a second end wall configured to oppose a first end surface and an opposite second end surface of a rolling element, and
a first side wall and a second side wall extending from the first end wall to the second end wall and defining with the first end wall and the second end wall a pocket for receiving the rolling element, the first side wall and the second side wall being configured to oppose a curved side surface of the rolling element,
wherein the first end wall includes at least one protrusion extending into the pocket and configured to contact the first end surface of the rolling element, and
wherein the at least one protrusion of the first end wall is kidney shaped.

8. The cage segment according to claim 7,
wherein the at least one protrusion of the first end wall is formed as a separate element and connected to the first end wall.

9. An assembly comprising:
a rolling element having a first end surface and a second end surface opposite the first end surface, the first end surface including a central recess surrounded by an abutment region, and
a cage segment comprising:
a first end wall and a second end wall opposing the first end surface and the second end surface respectively of the rolling element, and
a first side wall and a second side wall extending from the first end wall to the second end wall and defining with the first end wall and the second end wall a pocket for receiving the rolling element, the first side wall and the second side wall opposing a curved side surface of the rolling element,
wherein the first end wall includes at least one protrusion extending into the pocket and configured to contact the first end surface of the rolling element and/or the second end wall includes at least one protrusion extending into the pocket and configured to contact the second end surface of the rolling element,
wherein the rolling element is mounted in the cage segment with the first end surface of the rolling element in contact with the at least one protrusion of the first end wall and/or the second end surface of the rolling element in contact with the at least one protrusion of the second end wall,
wherein the at least one protrusion of the first end wall contacts the abutment region, and
wherein the at least one protrusion does not overly the central recess.

10. The assembly according to claim 9, wherein the first side wall is formed from a first metal sheet having a first portion bent to form a portion of the first end wall and a second portion bent to form a portion of the second end wall, wherein the second side wall is formed from a second metal sheet having a first portion bent to form a portion of the first end wall and a second portion bent to form a portion of the second end wall, wherein the first portion of the first side wall is connected to the first portion of the second side wall at a first joint to form the first end wall and the second portion of the first side wall is connected to the second portion of the second side wall at a second joint to form the second end wall, wherein the first end wall includes the at least one protrusion configured to contact the first end surface of the rolling element and the second end wall includes the at least one protrusion configured to contact the second end surface of the rolling element, wherein the at least one protrusion of the first end wall comprises a first protrusion of the first end wall and a second protrusion of the first end wall, wherein the at least one protrusion of the second end wall comprises a first protrusion of the second end wall and a second protrusion of the second end wall, and wherein the first protrusion of the first end wall is located on a first side of the first joint and the second protrusion of the first end wall is located on a second side of the first joint and the first protrusion of the second end wall is located on a first side of the second joint and the second protrusion of the second end wall is located on a second side of the second joint.

11. The assembly according to claim 10, wherein the first protrusion of the first end wall, the second protrusion of the first end wall, the first protrusion of the second end wall and the second protrusion of the second end wall are kidney-shaped.

12. The assembly according to claim 10, wherein the at least one protrusion of the first end wall is formed as a separate element and connected to the first end wall.

\* \* \* \* \*